Dec. 4, 1951  W. A. TOLSON  2,577,166
AIRCRAFT TRAFFIC CONTROL SYSTEM
Filed Sept. 30, 1947  2 SHEETS—SHEET 1

Inventor:
William A. Tolson
By J. L. Whittaker
Attorney

Inventor:
William A. Tolson
By J. L. Whittaker
Attorney

Patented Dec. 4, 1951

2,577,166

UNITED STATES PATENT OFFICE 2,577,166

AIRCRAFT TRAFFIC CONTROL SYSTEM

William A. Tolson, Princeton, N. J., assignor to Radio Corporation of America, a corporation of Delaware Application September 30, 1947, Serial No. 777,062

6 Claims. (Cl. 343—11)

This invention relates to improvements in navigation of aircraft by radio, and more particularly to the indication of the positions in space of aircraft in the vicinity of a ground station. Radar apparatus of the PPI (plan position indicator) type is used to show the map or plan positions of aircraft. Such apparatus ordinarily shows all aircraft upon a single visual indicator, regardless of their respective altitudes.

Copending U. S. patent application Serial Number 618,969 filed September 27, 1945 by Philip J. Herbst and entitled "Radio Navigation System" discloses a system for producing a plurality of plan indications, each corresponding to a respective altitude layer. Said system requires measurement of altitude at the aircraft, and transmission of the altitude information to the ground station to select which of the indicators is to show the position of the craft.

The principal object of the present invention is to provide separate indications according to altitude without requiring any equipment aboard the craft. This is particularly desirable even with an integrated radar and television relay system like that described in the above-mentioned copending application, since it shows the positions of itinerant aircraft and others not equipped to transmit information to the ground station.

Figure 1:
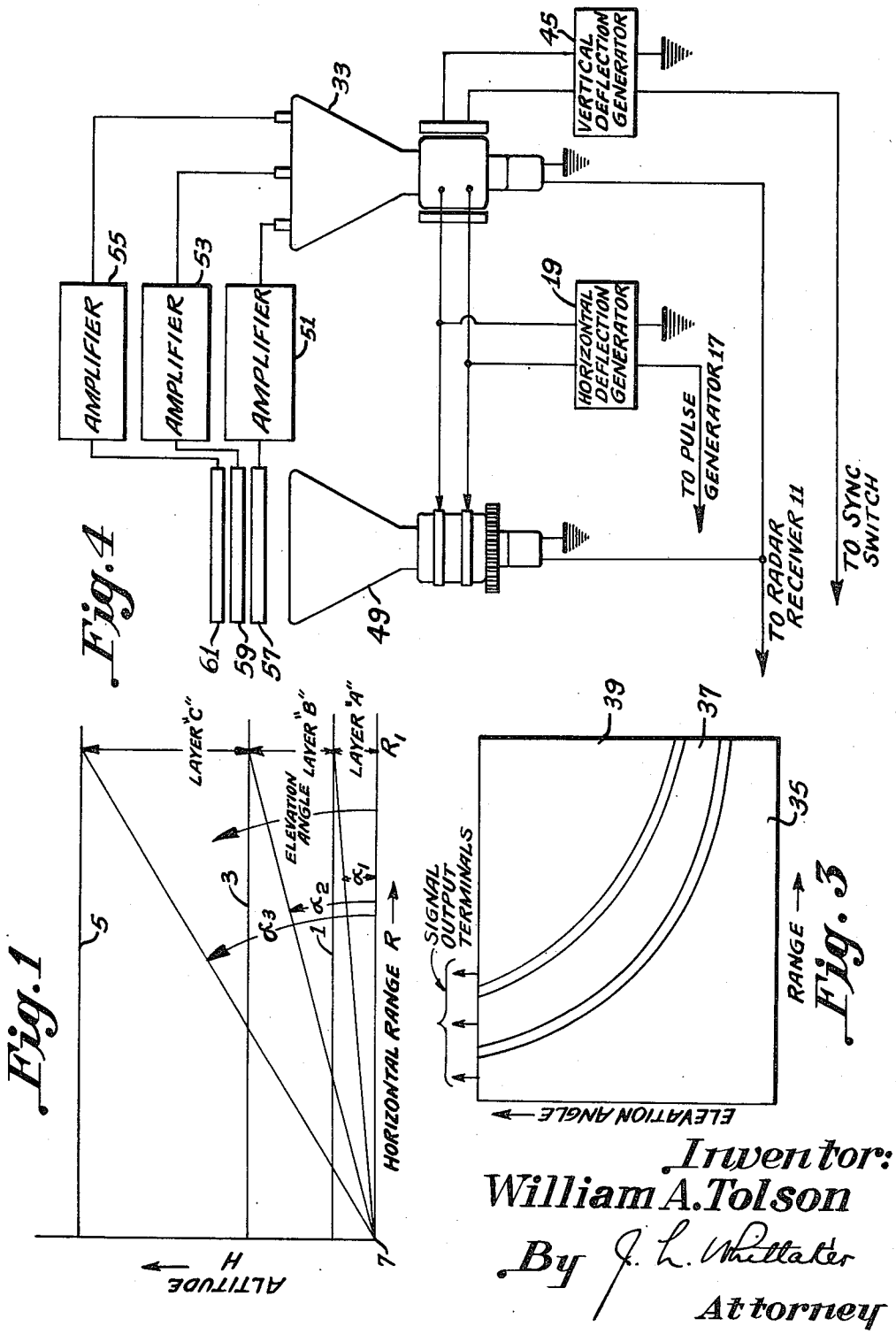
Figure 2:
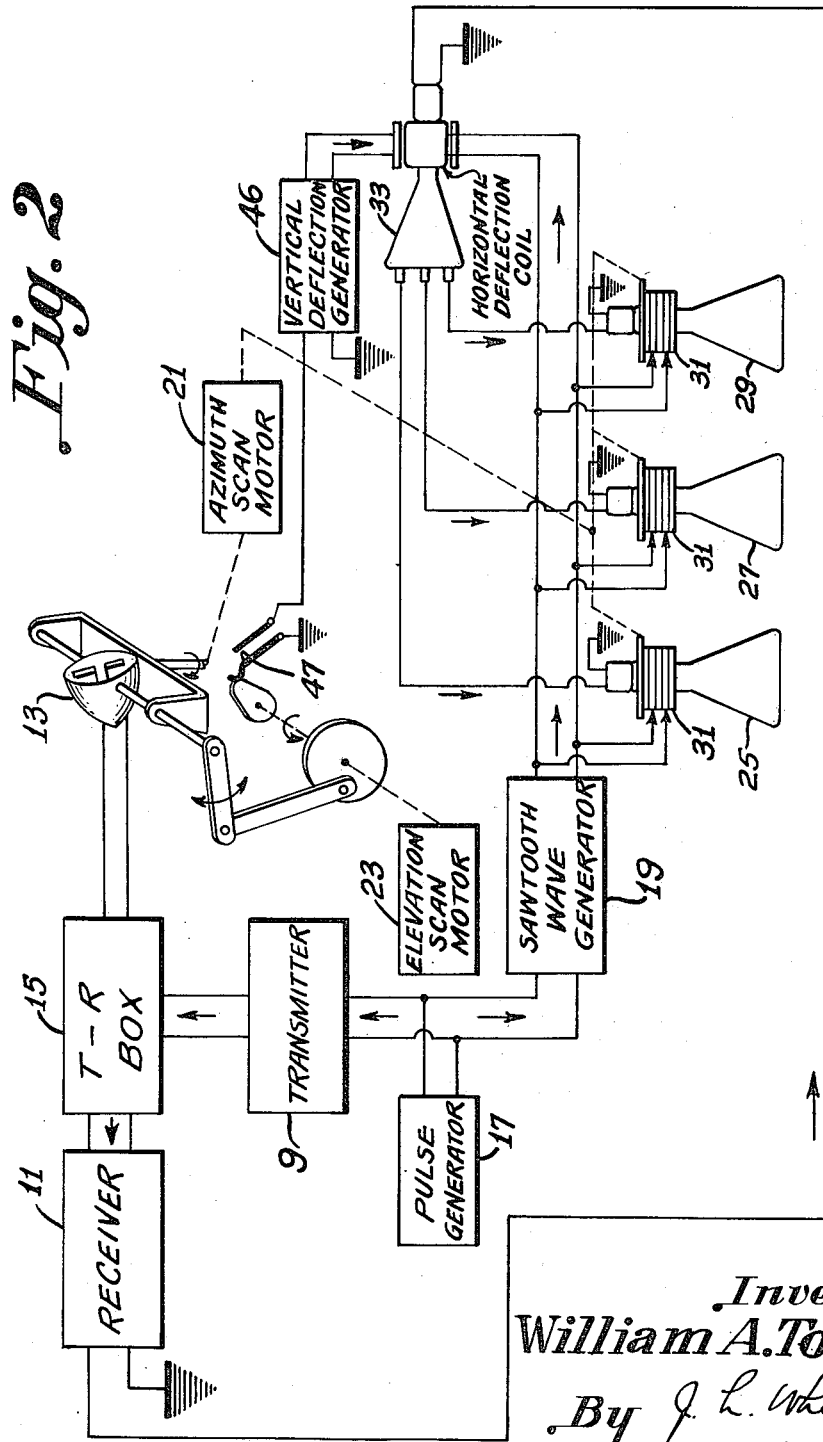

The invention will be described with reference to the accompanying drawings, wherein:

Figure 1 is a graph showing the relationship between range, elevation angle, and altitude of an aircraft with respect to a ground station, Figure 2 is a schematic diagram of a ground based radar station embodying the instant invention, Figure 3 is an elevation of a target used in one of the tubes constituting an element of the system of Fig. 2, and Fig. 4 is a schematic diagram showing a modification of the system of Fig. 2.

Similar reference characters are applied to similar elements throughout the drawings.

In observing and supervising the movements of aircraft, especially in the vicinity of an airport, it is convenient and sometimes essential to divide the space into several altitude layers which are assigned to aircraft traffic of different classes. For example layer A, extending from the ground to 500 feet, is assigned to aircraft which are taking off or coming in for landing. Layer B from 500 to 2000 feet, is for flights of local character, such as shuttle service between adjacent airports, and layer C, 2000 to 10,000 feet, is reserved for cross-country or express craft not intended to land or take off in the immediate vicinity of the ground station.

Referring to Fig. 1, the horizontal lines 1, 3 and 5 represent in profile the boundaries of three such layers. The point 7 is the location of a ground station. It will be apparent that an aircraft at a range or distance $R_1$ from the ground station and anywhere within the layer A will be at an elevation angle somewhere between zero and $a_1$. Similarly a craft at range $R_1$ in layer B will have an elevation with respect to the ground station between $a_1$ and $a_2$, and the boundaries of layer C are likewise defined at the range $R_1$ by elevation angles $a_2$ and $a_3$. At any other range, the altitude layers A, B and C can be described by other elevation angles. In general, $$H = R \tan a$$

where H is the altitude, R is the range, and $a$ is the elevation angle.

According to the present invention, the range and elevation angle of each craft in the service area are measured by the radar equipment. The altitude layer within which the craft is flying is determined automatically from the range and elevation, and the position in plan is accordingly shown on an indicator corresponding to that layer.

Referring to Fig. 2, the illustrated system includes a transmitter 9, a receiver 11, and a directive antenna 13. A duplexing device or T-R box 15 isolates the receiver from the transmitter while the latter is operating. A pulse generator 17 modulates the transmitter 9 and also controls a saw-tooth wave generator 19, to initiate a sawtooth in synchronism with each pulse.

The antenna 13 is designed to provide a single sharp beam which may be moved in azimuth by a motor 21 and in elevation by a motor 23. The motor 21 rotates the beam continuously in azimuth at a relatively slow rate, while the motor 23 oscillates the beam in elevation at a much higher rate. Although a crank and pitman arrangement is shown for providing the elevation scanning motion, an antenna of the type described in copending U. S. patent application 533,311 filed April 29, 1944 by Harley Iams and entitled "Improvement in Radio Wave Devices," now Patent No. 2,504,333 issued April 18, 1950, may be used to provide the required scanning.

A plurality of cathode ray oscilloscope tubes 25, 27 and 29 are each provided with a rotatable deflection yoke 31 rotated by the motor 21 in synchronism with the azimuthal motion of the antenna 13. The yokes 31 are connected through slip rings to the saw-tooth wave generator 19.

A conventional PPI radar system includes one or more tubes like the tube 25, with the cathode ray beam intensity controlled directly by the output of the receiver 11. The present system differs in that the output of the receiver is supplied to only one of the cathode ray indicators at a time, depending upon the altitude layer from which a reflection is received.

The distribution of the received signals is accomplished by a special cathode ray tube 33, of the type described in copending U. S. patent application 673,016 filed May 29, 1946 by W. A. Tolson and entitled "Improvement in Computing Devices," now abandoned, for which application Serial No. 66,674 filed December 22, 1948, now Patent No. 2,545,123 issued March 13, 1951, has been substituted. The tube 33 is substantially like a cathode ray oscilloscope tube, except that instead of having a fluorescent screen it is provided with an internal target divided into a plurality of electrically separate segments which are connected to respective output terminals. In the present example, the target comprises three segments connected respectively to the beam intensity control electrodes of the indicator tubes 25, 27 and 29.

Figure 3 shows the target in the tube 33. The three sections 35, 37 and 39 are separated by small gaps 41 and 43, curved like graphs of the relationship between elevation angle and range which define the boundaries 1 and 3 (Fig. 1) between the altitude layers A, B and C. The target section 35 represents layer A, and sections 37 and 39 represent altitude layers B and C respectively. The sections 35, 37 and 39 are connected to the indicators 25, 27 and 29 respectively.

The tube 33 is provided with separate horizontal and vertical beam deflection elements, connected respectively to the saw-tooth wave generator 19 and to a vertical deflection generator 45. The generator 45 is synchronized by a periodic switch 47 driven by the elevation scanning motor 23 to provide a wave which deflects the cathode ray beam of the tube 33 vertically in accordance with the elevation of the radio beam of the antenna 13.

The operation of the above described system is in some respects the same as that of a prior art radar system of the PPI type. Each pulse from the generator 17 produces a pulse of radio frequency energy from the transmitter 9 and coincidentally initiates a saw-tooth wave in the generator 19. The radio pulse is radiated by the antenna 13 and if it strikes a reflecting object, a part of the reflected energy is received at the antenna some time (usually several microseconds) after the transmitted pulse. The time between transmission of a pulse and reception of the pulse after reflection is a measure of the distance or range of the reflecting object from the radar station.

The received pulse is amplified and demodulated by the receiver 11, whose output when reflection occurs resembles that of the generator 17 but is delayed with respect thereto. In the usual PPI system, the receiver output is applied to the cathode ray indicator tube to intensify the cathode ray beam each time a pulse is received thus producing a luminous spot on the screen at a position depending on the range and azimuth of the reflector. In the present system, the received pulses turn on or intensify the cathode ray beam in the tube 33.

The saw-tooth generator 19 sweeps the beam of the tube 33 horizontally across its target from left to right as viewed in Fig. 3. The position of the beam along the coordinate at the instant of reception of a pulse corresponds to the range of the reflecting object upon which the antenna 13 is bearing at the moment.

The vertical deflection generator 45 sweeps the cathode ray beam of the tube 33 vertically across its target, and the position of the beam along the vertical coordinate when a pulse is received depends upon the elevation angle of the antenna. The cathode ray beam is intensified by the receiver output, thus causing current to flow to the particular segment of the target at which the beam is pointed, but not to the other segments. With a target designed substantially as shown in Fig. 3, the tube 33 applies output only to the indicator tube corresponding to the altitude layer from which the reflected signal is received.

Each of the indicator tubes 25, 27 and 29 provides a visual display of the PPI type, but shows only the aircraft within the altitude layer assigned to it. It will be apparent without further description that any desired number of altitude layers may be used by providing additional indicator tubes and corresponding segments in the target of the tube 33. The indications appearing on the tubes 25, 27 and 29 may be transmitted by television to all aircraft in the respective altitude layers together with maps, weather indications and flight instructions, as described in the above mentioned Herbst application.

As an alternative to using separate PPI tubes for the different altitude layers, a single indicator tube 49 (see Fig. 4) may be connected to the radar receiver as in prior art systems. The special cathode ray distributor tube is connected as in Fig. 2 to the vertical and horizontal deflection generators and the receiver 11, but its several outputs are applied to respective amplifiers 51, 53 and 55. The outputs of the amplifiers are applied to electrically controlled light filters 57, 59 and 61 respectively placed over the screen of the tube 49. The filters 57, 59 and 61 may each comprise two parallel plates, one of which rotates the plane of polarization of light passing through it by 90 degrees when a voltage is applied to it, and the other of which transmits all colors in one plane of polarization, but only one color in a plane at right angles thereto. The polarizing plates can be Kerr cells or the like, containing nitrobenzene or a similar material. The color plates comprise dichroic crystals, for example quinine combined with an aniline dye. The particular dyes are selected to transmit different colors such as red, blue and green respectively.

In the operation of the indicator shown in Fig. 4, the tube 33 energizes the appropriate filter according to the altitude layer from which a reflection is received. The resulting visual display comprises spots of different colors positioned with respect to each other as in a conventional PPI display but colored in accordance with the altitude layers of the craft which they represent.

I claim as my invention:

1. In a radio navigation system including ground based radar equipment which transmits pulse modulated radio signals in a narrow beam and receives those of said signals which are reflected by mobile craft within a service area after delays proportional to the ranges thereof, means moving said beam to scan said service area continuously in azimuth, means simultaneously moving said beam to scan cyclically in elevation, a plurality of visual indicators, each corresponding to a respective altitude layer and each including a cathode ray oscilloscope, means deflecting the cathode ray beam thereof in synchronism with the pulse modulation of said radar equipment in a radial direction corresponding to the azimuth of said beam, means for selectively applying reflected pulse signals received from any craft in said service area to a particular one of said indicators, the last-mentioned means including means responsive both to the delay of the pulse signals received from said craft and to the elevation angle of the beam while the last-mentioned signals are being received so as effectively to couple the receiver of the radar equipment to only the one of said indicators which corresponds to the altitude of said craft.

2. In a radio navigation system including ground based radar equipment which transmits pulse modulated radio signals in a narrow beam and receives those of said signals which are reflected by mobile craft within a service area after delays proportional to the ranges thereof, means moving said beam to scan said service area continuously in azimuth, means simultaneously moving said beam to scan cyclically in elevation, visual indicator means synchronized with the pulse modulation of said radar equipment, means for applying reflected pulse signals received from any craft in said service area to said indicator means, the last-mentioned means including means responsive both to the delays of the pulse signals received from said craft and to the elevation angle of the beam while said last-mentioned signals are being received to cause the indications provided by said indicator means to have a distinctive character representing the altitude layer in which said craft is located.

3. In a radio navigation system including ground based radar equipment which transmits pulse modulated radio signals in a narrow beam and receives those of said signals which are reflected by mobile craft within a service area after delays proportional to the ranges thereof, means moving said beam to scan said service area continuously in azimuth, means simultaneously moving said beam to scan cyclically in elevation, a plurality of visual indicators, each corresponding to a respective altitude layer and each including a cathode ray oscilloscope, means deflecting the cathode ray beam thereof in synchronism with the pulse modulation of said radar equipment in a radial direction corresponding to the azimuth of said beam, cathode ray tube means for selectively applying reflected pulse signals received from any craft in said service area to a particular one of said indicators, said last mentioned means including means responsive to the delay of the pulse signals received from said craft and to the elevation angle of the beam while the last mentioned signals are being received so as effectively to couple the receiver of the radar equipment to only the one of said indicators which corresponds to the altitude of said craft, means modulating the beam of said cathode ray tube means with all of said received pulse signals, means deflecting said beam of said cathode ray tube along one coordinate in synchronism with said elevation scanning, means deflecting said beam of said cathode ray tube along another coordinate in synchronism with said pulse modulation, a multiple section target for said cathode ray tube beam whose sections are shaped to correspond to graphs of said altitude layer respectively in terms of range and elevation angle, whereby said beam varies the potential of one of said target sections only when a signal is reflected from a craft in the corresponding altitude layer, and means coupling each of said target sections to a corresponding one of said visual indicators.

4. In a radio navigation system including ground based radar equipment which transmits pulse modulated radio signals in a narrow beam and receives those of said signals which are reflected by mobile craft within a service area after delays proportional to the ranges thereof, means moving said beam to scan said service area continuously in azimuth, means simultaneously moving said beam to scan cyclically in elevation, visual indicator means comprising a plurality of cathode ray oscilloscopes each corresponding to a respective altitude layer synchronized with the pulse modulation of said radar equipment, means including means responsive both to the delays of the pulse signals received from said craft and to the elevation angle of the beam while said last mentioned signals are being received for applying said reflected pulse signals to said indicator means to cause the indications provided by said indicator means to have a distinctive character representing the altitude layer in which said craft is located, said last mentioned means comprising a cathode ray tube, means modulating the beam of said tube with all of said received pulse signals, means deflecting said beam along one coordinate in synchronism with said elevation scanning, means deflecting said beam along another coordinate in synchronism with the said pulse modulation, a multiple section target in the path of said cathode ray tube beam whose sections are shaped to correspond to graphs of said altitude layers respectively in terms of range and elevation angle, whereby said beam varies the potential of one of said sections only when a signal is reflected from a craft in the corresponding altitude layer, and a connection from each of said sections to a different one of said oscilloscope indicator means.

5. In a radio navigation system including ground based radar equipment which transmits pulse modulated radio signals in a narrow beam and receives those of said signals which are reflected by mobile craft within a service area after delays proportional to the ranges thereof, means moving said beam to scan said service area continuously in azimuth, means simultaneously moving said beam to scan cyclically in elevation, visual indicator means comprising a plurality of cathode ray oscilloscopes each corresponding to a respective altitude layer synchronized with the pulse modulation of said radar equipment, means including means responsive both to the delays of the pulse signals received from said craft and to the elevation angle of the beam while said last mentioned signals are being received for applying said reflected pulse signals to said indicator means to cause the indications provided by said indicator means to have a distinctive character representing the altitude layer in which said craft is located, a plurality of electrically controllable light filters juxtaposed with the fluorescent screen of said oscilloscope, each of said filters corresponding to a respective altitude layer, said means last mentioned comprising a cathode ray tube, means modulating the beam of said tube with all of said received pulse signals, means deflecting said beam along one coordinate in synchronism with said elevation scanning, means deflecting said beam along another coordinate in synchronism with said pulse modulation, a multiple section target having sections shaped to correspond to graphs of said altitude layers respectively in terms of range and elevation angle of said mobile craft, said target being in the path of said cathode ray tube beam, whereby said beam varies the potential of one of said sections only when a signal is reflected from a craft in the corresponding altitude layer, and a control circuit connecting each of said sections to a different one of said filters.

6. In a radio navigation system including ground based radar equipment which transmits pulse modulated radio signals in a narrow beam and receives those of said signals which are reflected by mobile craft within a service area after delays proportional to the ranges thereof, means moving said beam to scan said service area continuously in azimuth, means simultaneously moving said beam to scan cyclically in elevation, a plurality of visual indicators, each corresponding to a respective altitude layer and each including a cathode ray oscilloscope, means deflecting the cathode ray beam thereof in synchronism with the pulse modulation of said radar equipment in a radial direction corresponding to the azimuth of said beam, means for selectively applying reflected pulse signals received from any craft in said service area to a particular one of said indicators, the last-mentioned means including means responsive both to the delay of the pulse signals received from said craft and to the elevation angle of the beam while the last-mentioned signals are being received so as effectively to couple the receiver of the radar equipment to only the one of said indicators which corresponds to the altitude of said craft, said last-mentioned means comprising a pulse signal distributing device having an input circuit connected to the signal receiver, a plurality of outputs each connected to the oscilloscope of a different one of said visual indicators, two control voltage inputs for receiving simultaneously and respectively a first voltage proportional to said delay of the pulse signals and a second voltage proportional to said elevation angle, and means responsive to said voltages effectively to connect said input circuit to one of said output circuits which is connected to the oscilloscope of said one of the indicators.

WILLIAM A. TOLSON.

REFERENCES CITED

The following references are of record in the file of this patent:

UNITED STATES PATENTS

| Number | Name | Date |
|---|---|---|
| 2,426,189 | Espenschied | Aug. 26, 1947 |
| 2,427,905 | Fyler | Sept. 23, 1947 |
| 2,428,351 | Ayres | Oct. 7, 1947 |
| 2,434,897 | Ayres | Jan. 27, 1948 |
| 2,480,123 | Deloraine | Aug. 30, 1949 |

FOREIGN PATENTS

| Number | Country | Date |
|---|---|---|
| 588,851 | Great Britain | June 4, 1947 |